(12) United States Patent (10) Patent No.: US 12,611,944 B2
Otsuru et al. (45) Date of Patent: Apr. 28, 2026

(54) ELECTRIC CONSTRUCTION MACHINE

(71) Applicant: HITACHI CONSTRUCTION MACHINERY TIERRA CO., LTD., Koka (JP)

(72) Inventors: Toshiya Otsuru, Koka (JP); Seiichi Kihara, Koka (JP); Shogo Kimura, Ritto (JP); Takuma Kuwahara, Higashiomi (JP)

(73) Assignee: HITACHI CONSTRUCTION MACHINERY TIERRA CO., LTD., Koka (JP)

( * ) Notice: Subject to any disclaimer, the term of this patent is extended or adjusted under 35 U.S.C. 154(b) by 0 days.

(21) Appl. No.: 18/687,861

(22) PCT Filed: Oct. 27, 2022

(86) PCT No.: PCT/JP2022/040129
§ 371 (c)(1),
(2) Date: Feb. 29, 2024

(87) PCT Pub. No.: WO2023/074791
PCT Pub. Date: May 4, 2023

(65) Prior Publication Data
US 2025/0135924 A1 May 1, 2025

(30) Foreign Application Priority Data

Oct. 29, 2021 (JP) ................................. 2021-177464

(51) Int. Cl.
*B60L 53/16* (2019.01)
*E02F 3/32* (2006.01)
(Continued)

(52) U.S. Cl.
CPC ................ *B60L 53/16* (2019.02); *E02F 3/32* (2013.01); *E02F 9/0858* (2013.01); *E02F 9/26* (2013.01); *B60L 2200/40* (2013.01); *E02F 3/325* (2013.01)

(58) Field of Classification Search
CPC .......... B60L 50/53; B60L 50/60; B60L 53/14; B60L 53/16; B60L 2200/40; E02F 3/32;
(Continued)

(56) References Cited

U.S. PATENT DOCUMENTS 6,157,162 A * 12/2000 Hayashi ................ H02J 7/0042
320/104
2010/0133024 A1* 6/2010 Miwa .................... B60L 53/124
903/903
(Continued)

FOREIGN PATENT DOCUMENTS

CN 207079660 U * 3/2018 ................ E02F 9/24
JP 0402183 U 8/1992
(Continued)

OTHER PUBLICATIONS

International Search Report of PCT/JP2022/040129 dated Dec. 20, 2022.
(Continued)

*Primary Examiner* — Levi Gannon
(74) *Attorney, Agent, or Firm* — MATTINGLY & MALUR, PC

(57) ABSTRACT

A power feeding connector (18) to which a power feeding cable (19) for supplying electric power to an electric motor or a battery (12) is connected and an indicator lamp (25) that lights up when a lower traveling structure (2), an upper revolving structure (3) or a working mechanism (4) is in the middle of operating are arranged in back of an operator's seat (7). An insert port (18A) of the power feeding connector
(Continued)

(18) which the power feeding cable (19) is connected or disconnected is located to be oriented to the indicator lamp (25)-side in the left-right direction. Because of this arrangement, the insert port (18A) can be illuminated by light emitted from the indicator lamp (25), allowing an operator of an electric hydraulic excavator (1) and workers around it to recognize that the electric power fed from an external power source (13) is being supplied to the electric hydraulic excavator (1) via the power feeding cable (19) connected to the power feeding connector (18) and that the electric hydraulic excavator (1) is in the middle of operating with this electric power.

4 Claims, 7 Drawing Sheets

(51) Int. Cl.
    *E02F 9/08*         (2006.01)
    *E02F 9/26*         (2006.01)

(58) Field of Classification Search
    CPC . E02F 3/325; E02F 9/0858; E02F 9/24; E02F 9/26; E02F 9/264
    See application file for complete search history.

(56)            References Cited

U.S. PATENT DOCUMENTS

| | | | | |
|---|---|---|---|---|
| 2010/0315040 | A1* | 12/2010 | Sakurai | B60L 53/20 |
| | | | | 320/109 |
| 2012/0083148 | A1* | 4/2012 | Hirashita | H01R 13/639 |
| | | | | 439/304 |
| 2012/0218779 | A1 | 8/2012 | Sawayanagi | |
| 2012/0319648 | A1* | 12/2012 | Ohtomo | B60L 3/00 |
| | | | | 320/109 |
| 2013/0307325 | A1* | 11/2013 | Arasu | B60L 50/16 |
| | | | | 439/449 |
| 2015/0038020 | A1* | 2/2015 | Kinomura | B60L 50/66 |
| | | | | 439/653 |
| 2018/0354383 | A1* | 12/2018 | Namou | B60L 53/124 |
| 2019/0027867 | A1* | 1/2019 | Ognjanovski | H01R 13/6691 |
| 2020/0083701 | A1* | 3/2020 | Myer | G01K 5/52 |
| 2022/0275601 | A1* | 9/2022 | Kunizawa | E02F 9/0808 |
| 2022/0355690 | A1* | 11/2022 | Linsmeier | B60K 6/40 |

FOREIGN PATENT DOCUMENTS

| | | | |
|---|---|---|---|
| JP | 2002-327469 | A | 11/2002 |
| JP | 2008-008009 | A | 1/2008 |
| JP | 2010-022164 | A | 1/2010 |
| JP | 2012-178230 | A | 9/2012 |
| JP | 2012-181984 | A | 9/2012 |
| JP | 2018-084099 | A | 5/2018 |
| JP | 2020-045702 | A | 3/2020 |
| KR | 10-2012-0033587 | A | 4/2012 |
| KR | 20130004413 | U | 7/2013 |

OTHER PUBLICATIONS

Korean Office Action received in corresponding Korean Application No. 10-2024-7006785 dated Feb. 16, 2026.

* cited by examiner

ELECTRIC CONSTRUCTION MACHINE

TECHNICAL FIELD

The present invention relates to electric construction machines, such as a hydraulic excavator provided with an electric motor serving as a power source.

BACKGROUND ART

A hydraulic excavator as a representative example of a construction machine is provided with an automotive lower traveling structure, an upper revolving structure that is mounted via a revolving device on the lower traveling structure to be capable of revolving thereto and configures a vehicle body together with the lower traveling structure, and a working mechanism disposed on the front side of the upper revolving structure. In recent years, for suppressing global warming and air pollution, electric hydraulic excavators each provided with an electric motor serving as a power source have been put to practical use. This electric hydraulic excavator supplies hydraulic oil for operation to hydraulic actuators by driving a hydraulic pump with the electric motor (refer to Patent Document 1).

The electric hydraulic excavator is usually provided with an electric motor, a battery and a battery charger. Electric power fed from an external power source is supplied via the battery charger and the like to the electric motor, and the battery is recharged by the extra electric power. Therefore, the electric hydraulic excavator is provided with a power feeding connector, and a power feeding cable connected to the external power source is fitted in an insert port of the power feeding connector, thereby, the electric hydraulic excavator being connected electrically to the battery charger. With this configuration, the electric motor is driven by the electric power fed from the external power source or the battery, and by hydraulic oil from the hydraulic pump driven by the electric motor, the electric hydraulic excavator carries out an excavating work of earth and sand, or the like using the working mechanism, while revolving the upper revolving structure.

PRIOR ART DOCUMENT

Patent Document

Patent Document 1: Japanese Patent Laid-Open No. 2008-8009 A

SUMMARY OF THE INVENTION

The electric hydraulic excavator operates in a state where the external power source and the power feeding connector are connected by the power feeding cable and the work is carried out by the power supply from the external power source and in a state where the external power source and the power feeding connector are not connected and the work is carried out by the power supply from the battery mounted on the vehicle body. In the state where the external power source and the power feeding connector are connected by the power feeding cable, there is a possibility that the power feeding cable is damaged caused by the treading of the power feeding cable by the traveling vehicle body, the catching-in of the power feeding cable at the revolving of the upper revolving structure, or the like. Because of this configuration, an operator in the electric hydraulic excavator is required to promptly figure out presence and absence of the connection of the power feeding cable to the power feeding connector. In addition, also for a worker around the electric hydraulic excavator, because of the swinging of the power feeding cable caused by a drive of the electric hydraulic excavator, it is important to figure out the presence or absence of connection of the power feeding cable to the power feeding connector also for recognizing his or her safe working range.

However, particularly at the night-time work using the electric hydraulic excavator, in a case where an illumination facility for illuminating the electric hydraulic excavator is not sufficient for light, there is posed a problem that the operator of the electric hydraulic excavator and the worker around it are difficult to recognize the power feeding cable connected to the power feeding connector.

An object of the present invention is to provide an electric construction machine that allows an operator of the electric hydraulic excavator and a worker around it to recognize that electric power fed from an external power source is being supplied via a power feeding cable thereto.

An aspect of the present invention is provided with an electric construction machine comprising: an automotive vehicle body provided with an operator's seat; and a working mechanism disposed on the vehicle body, the vehicle body including: an electric motor serving as a power source; a battery for storing electric power to be supplied to the electric motor; a power feeding connector to which a power feeding cable for supplying the electric power to the electric motor or the battery is connected; and an indicator lamp for lighting up when the vehicle body or the working mechanism is in the middle of operating, characterized in that the power feeding connector and the indicator lamp are arranged in back of the operator's seat and the insert port of the power feeding connector which the power feeding cable is connected or disconnected is located to be oriented to the indicator lamp side in the left-right direction.

According to the aspect of the present invention, when the indicator lamp lights up at the operating of the vehicle body or the working mechanism at the night-time working, it is possible to illuminate the power feeding cable fitted in the insert port of the power feeding connector. This configuration allows an operator of the electric hydraulic excavator and a worker around it to recognize that the electric power fed from the external power source is being supplied via the power feeding cable thereto.

MODE FOR CARRYING OUT THE INVENTION

Figure 1:
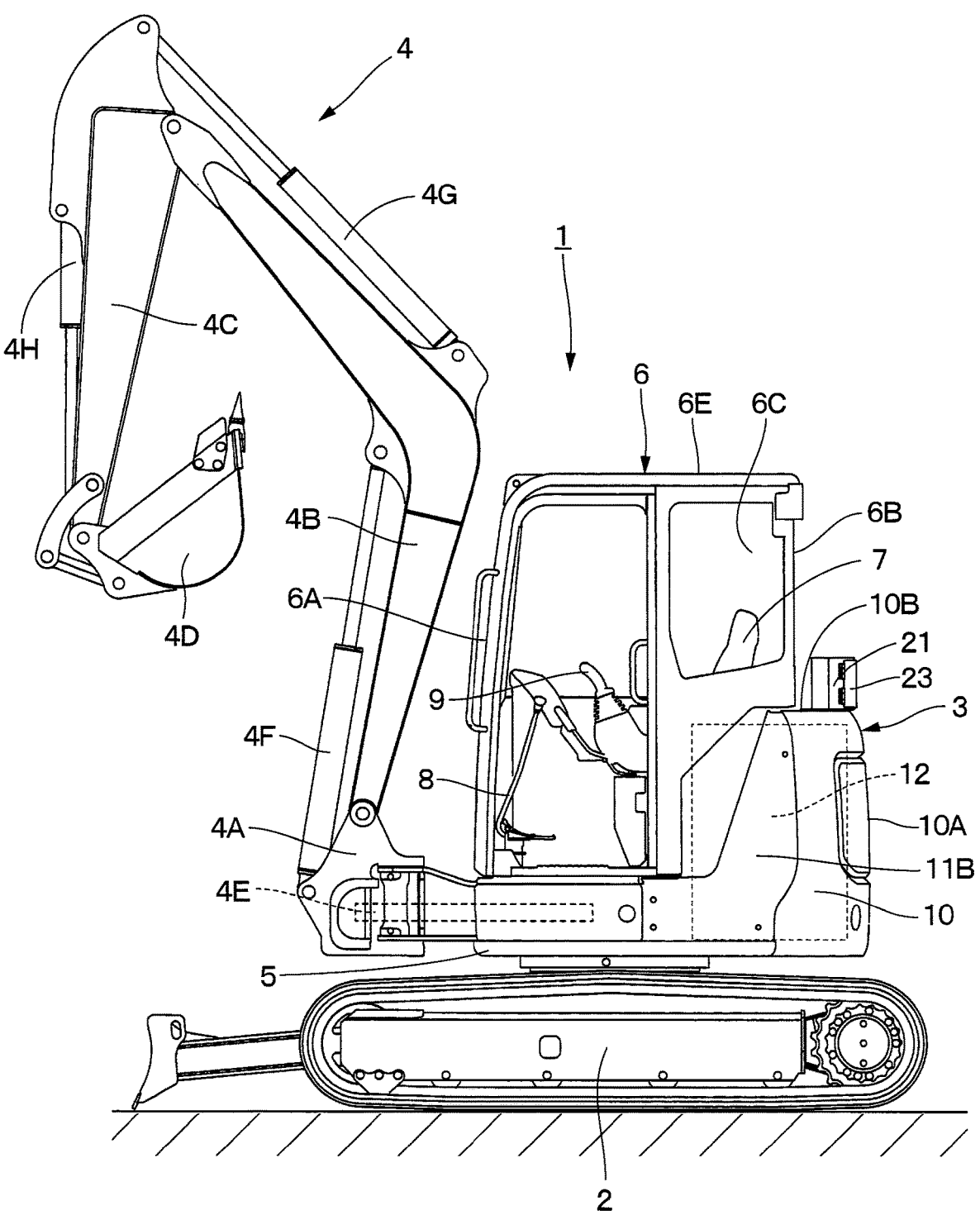
FIG. 1 is a left side view showing an electric hydraulic excavator according to an embodiment of the present invention.
Figure 2:
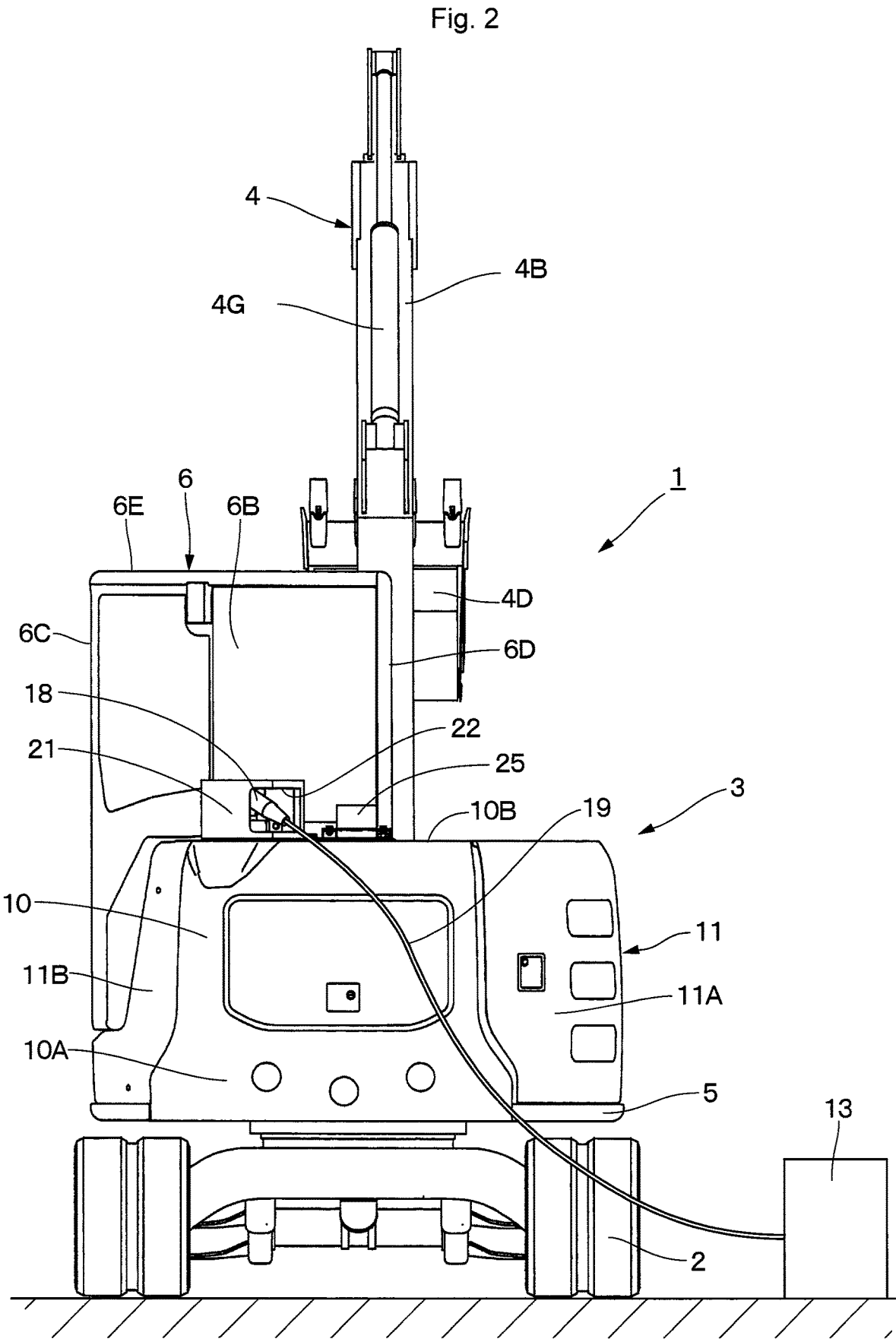
FIG. 2 is a rear view showing the electric hydraulic excavator as viewed from the backward.

Hereinafter, an electric construction machine according to an embodiment of the present invention will be in detail explained referring to FIG. 1 to FIG. 8 by taking a case of being applied to an electric hydraulic excavator as an example. It should be noted that an explanation will be made of the embodiment by defining a traveling direction of the electric hydraulic excavator as a front-rear direction and a direction perpendicular to the traveling direction as a left-right direction.

An electric hydraulic excavator 1 representative of an electric construction machine is provided with an automotive lower traveling structure 2 of a crawler type in the front-rear direction and an upper revolving structure 3 mounted on the lower traveling structure 2 to be capable of revolving thereto. A vehicle body of the electric hydraulic excavator 1 is configured of the lower traveling structure 2 and the upper revolving structure 3. A swing type working mechanism 4 is disposed on the front side of the upper revolving structure 3. The working mechanism 4 is used to carry out an excavating work of earth and sand, or the like.

The swing type working mechanism 4 is provided with a swing post 4A disposed on the front side of a revolving frame 5 to be described later to be capable of swinging in the left-right direction. A boom 4B is attached to the swing post 4A to be rotatable thereto, and an arm 4C is attached to a tip end of the boom 4B to be rotatable thereto, and a bucket 4D is attached to a tip end of the arm 4C to be rotatable thereto. In addition, the working mechanism 4 is provided with a swing cylinder 4E for swinging the swing post 4A, a boom cylinder 4F for rotating the boom 4B, an arm cylinder 4G for rotating the arm 4C, and a bucket cylinder 4H for rotating the bucket 4D.

The upper revolving structure 3 is mounted via a revolving device on the lower traveling structure 2 to be capable of revolving thereto and carries out a revolving movement on the lower traveling structure 2. The upper revolving structure 3 is provided with the revolving frame 5 serving as a base. The revolving frame 5 is provided with a cab 6, a counterweight 10, an exterior cover 11, a battery 12, which will be described later, and the like, which are mounted thereon.

The cab 6 is disposed on the left side of the revolving frame 5. The cab 6 is formed in a boxy shape in such a manner as to be surrounded by a front surface 6A, a rear surface 6B, a left side surface 6C, a right side surface 6D and an upper surface 6E, forming an operator's room in which an operator gets. An operator's seat 7 for the operator to sit on, a traveling lever and pedal 8 for controlling a traveling movement of the lower traveling structure 2, a working operational lever 9 for controlling the revolving movement of the upper revolving structure 3 and the movement of the working mechanism 4, and the like are arranged in the cab 6.

The counterweight 10 is disposed on the rear end of the revolving frame 5 to be positioned closer to the rear side than the cab 6. The counterweight 10 acts as a weight balance to the working mechanism 4 disposed on the front side of the revolving frame 5. The counterweight 10 rises upward from the rear end of the revolving frame 5 to cover the battery 12 and the like from the backward.

A rear surface 10A of the counterweight 10 is formed in an arc shape in such a manner that a central part of the rear surface 10A of the counterweight 10 in the left-right direction projects backward. With this configuration, when the upper revolving structure 3 revolves, the rear surface 10A of the counterweight 10 is accommodated within a constant revolving radius. In addition, a power feeding connector 18 and an indicator lamp 25 are attached via a base member 14 to be described later on an upper surface 10B of the counterweight 10.

The exterior cover 11 is disposed on the revolving frame 5 to be positioned in front of the counterweight 10. The exterior cover 11 covers mounted equipment such as an electric motor, a hydraulic pump (none of them are shown), the battery 12 and the like, which are mounted on the revolving frame 5, together with the counterweight 10. The exterior cover 11 includes a right exterior cover 11A for covering the mounted equipment from the right side and the upper side, and a left exterior cover 11B for covering the mounted equipment from the left side.

The battery 12 is located in front of the counterweight 10. The battery 12 stores electric power to be supplied to the electric motor (not shown) serving as a power source. The electric power fed from an external power source 13 is supplied via the battery charger and the like to the electric motor (none of them are shown), and the battery 12 is recharged with the extra electric power. The electric motor drives the hydraulic pump (not shown) by the electric power fed from the external power source 13, and the electric hydraulic excavator 1 carries out an excavating work of earth and sand, and the like by using the working mechanism 4 while revolving the upper revolving structure 3.

Next, an explanation will be made of the base member 14, the power feeding connector 18 and the indicator lamp 25 to be used in the present embodiment. The base member 14, the power feeding connector 18 and the indicator lamp 25 are configured as one unit, which is disposed on the upper surface 10B of the counterweight 10 to be positioned in back of the operator's seat 7.

The base member 14 is attached on the upper surface 10B of the counterweight 10 to be positioned on the rear side of the rear surface 6B of the cab 6. The base member 14 is attached on the counterweight 10 in a state where the power feeding connector 18 and the indicator lamp 25 are attached integrally. As shown FIG. 6 and FIG. 7, the base member 14 includes a base plate 15 in a flat plate shape extending in the left-right direction, a connector attaching seat 16 disposed on the left side of the base plate 15 and an indicator lamp attaching seat 17 disposed on the right side of the base plate 15.

A cable through hole 15A is formed in a portion, which is closer to the left side than the connector attaching seat 16, in the base plate 15 to penetrate therethrough in the upper-lower direction. A connecting cable 20 (refer to FIG. 8) for connection between the power feeding connector 18 and the battery charger (not shown) is inserted in the cable through hole 15A. Two large-diameter holes 15B are formed in a portion, which is closer to the right side than the connector attaching seat 16, in the base plate 15 to be separated from each other in the left-right direction. In addition, two small-diameter holes 15C (one alone is illustrated) are formed in a portion, which is closer to the left side than the cable through hole 15A, in the base plate 15 to be separated from each other in the front-back direction. Further, a cover attaching plate 15D composed of a plate body bent in an L-letter shape is disposed upward in a portion, which is closer to the front side than the cable through hole 15A, in the base plate 15, and a nut 15E is welded to the cover attaching plate 15D.

Two large-diameter bolts 15F inserted in the large-diameter holes 15B of the base plate 15 and two small-diameter bolts 15G inserted in the small-diameter holes 15C of the base plate 15 are respectively screwed into female screw holes (not shown) arranged on the upper surfaces 10B of the counterweight 10. Because of this arrangement, the base plate 15 is fixed on the upper surface 10B of the counterweight 10.

The connector attaching seat 16 is disposed upward on the base plate 15 to be positioned on the right side to the cable through hole 15A, and the power feeding connector 18 and the connector cover 21 are attached thereto. The connector attaching seat 16 is formed by performing bending work to a steel plate or the like and includes a connector attaching plate 16A rising upward from the base plate 15 and a cover attaching plate 16B bent to the right side from the front end of the connector attaching plate 16A. The connector attaching plate 16A is provided with a quadrangular square hole 16C penetrating therethrough in the plate thickness direction and four nuts 16D welded thereto in such a manner as to surround the square hole 16C. In addition, one bolt through hole 16E is formed on the lower side of the cover attaching plate 16B.

The indicator lamp attaching seat 17 is disposed on the base plate 15 to be positioned on the right side to the connector attaching seat 16, and the indicator lamp 25 is attached to the indicator lamp attaching seat 17. The indicator lamp attaching seat 17 is composed of two frame bodies 17A bent in a reverse U-letter shape, and the two frame bodies 17A are welded on the base plate 15 in a state of being separated from each other in the left-right direction and project upward from the base plate 15. A bolt through hole 17C is formed on an upper surface 17B of each of the two frame bodies 17A, and a nut (not shown) is welded on the backside of the upper surface 17B to be concentric with the bolt through hole 17C.

The power feeding connector 18 is attached to the connector attaching seat 16 of the base member 14 and is located in back of the operator's seat 7. The power feeding connector 18 is composed of a cylindrical body on an inner peripheral side of which a connecting terminal (not shown) is located, and a tip end of the power feeding connector 18 serves as an insert port 18A from/in which a power feeding cable 19 connected to the external power source 13 is pulled/inserted. A quadrangular attaching flange 18B is fixed to a tip end side of the power feeding connector 18 and four bolt through holes 18C corresponding to the nuts 16D of the connector attaching seat 16 are arranged in the attaching flange 18B.

Figure 8:
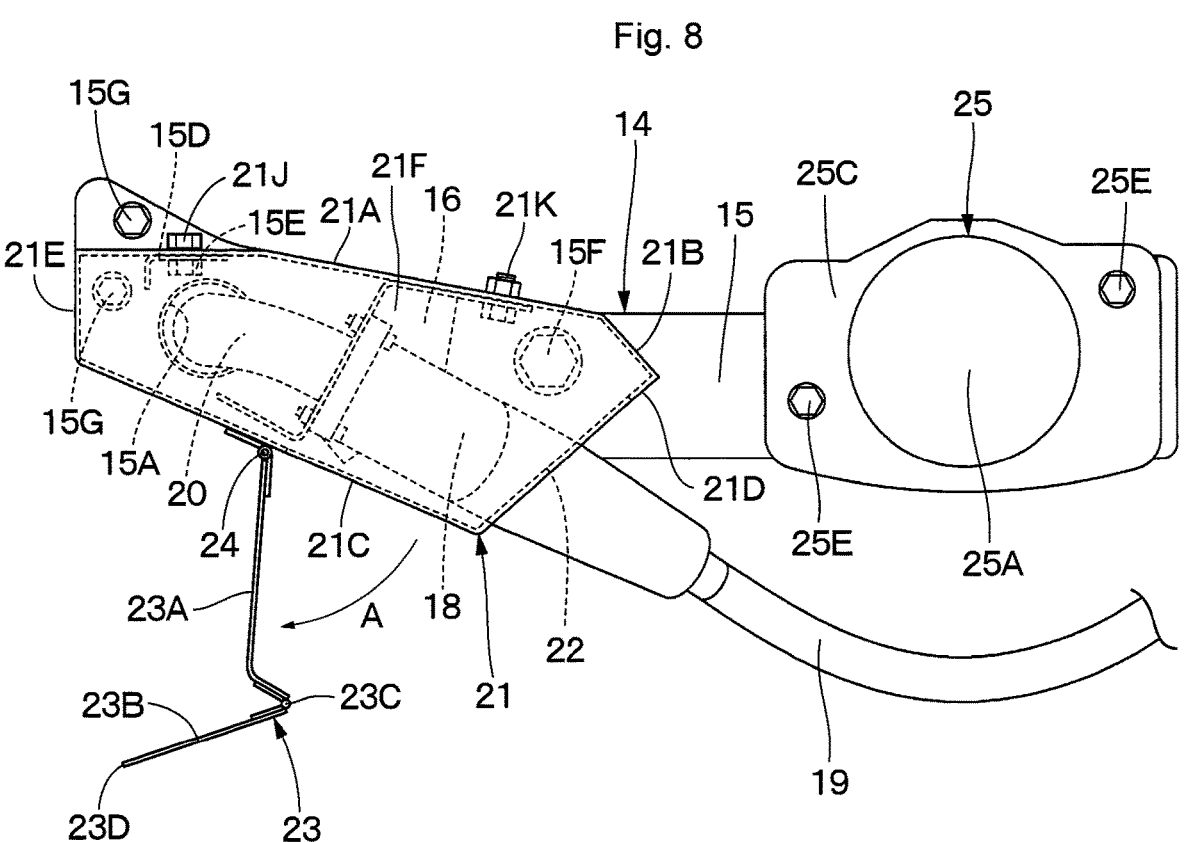
FIG. 8 is a plan view showing the base member, the power feeding connector, the connector cover, a power feeding cable and the indicator lamp as viewed from the upper side.

The power feeding connector 18 is attached to the connector attaching seat 16 by bolts 18D inserted in the bolt through holes 18C of the attaching flange 18B being threaded with the nuts 16D of the connector attaching seat 16. As shown in FIG. 8, the connecting cable 20 is connected to the power feeding connector 18 attached to the connector attaching seat 16, extends via the cable through hole 15A of the base plate 15 into the inside of the exterior cover 11 and is connected to the battery charger (not shown).

Figure 3:
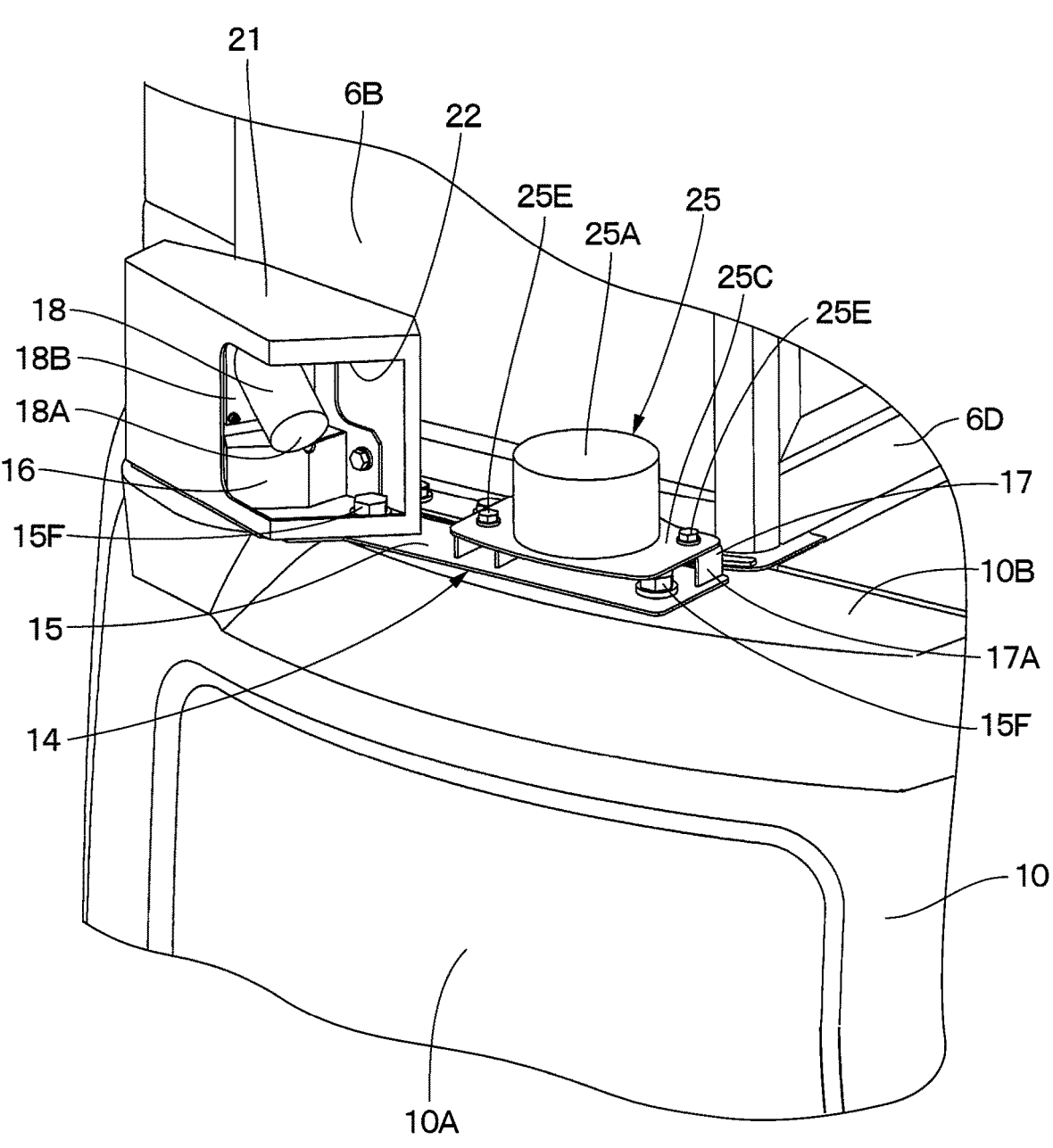
FIG. 3 is a perspective view showing an upper surface of a counterweight, a power feeding connector, and an indicator lamp as viewed from the right backward.
Figure 4:
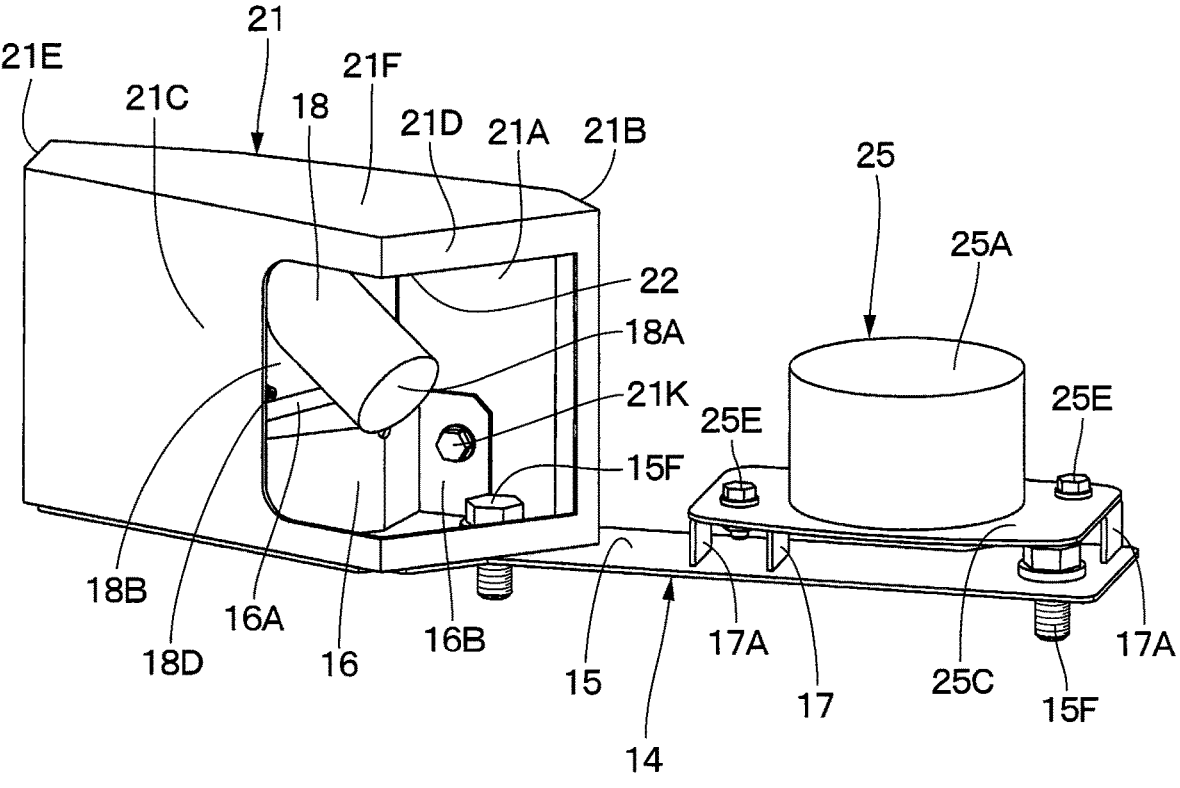
FIG. 4 is a perspective view showing a base member, the power feeding connector, a connector cover and the indicator lamp.
Figure 5:
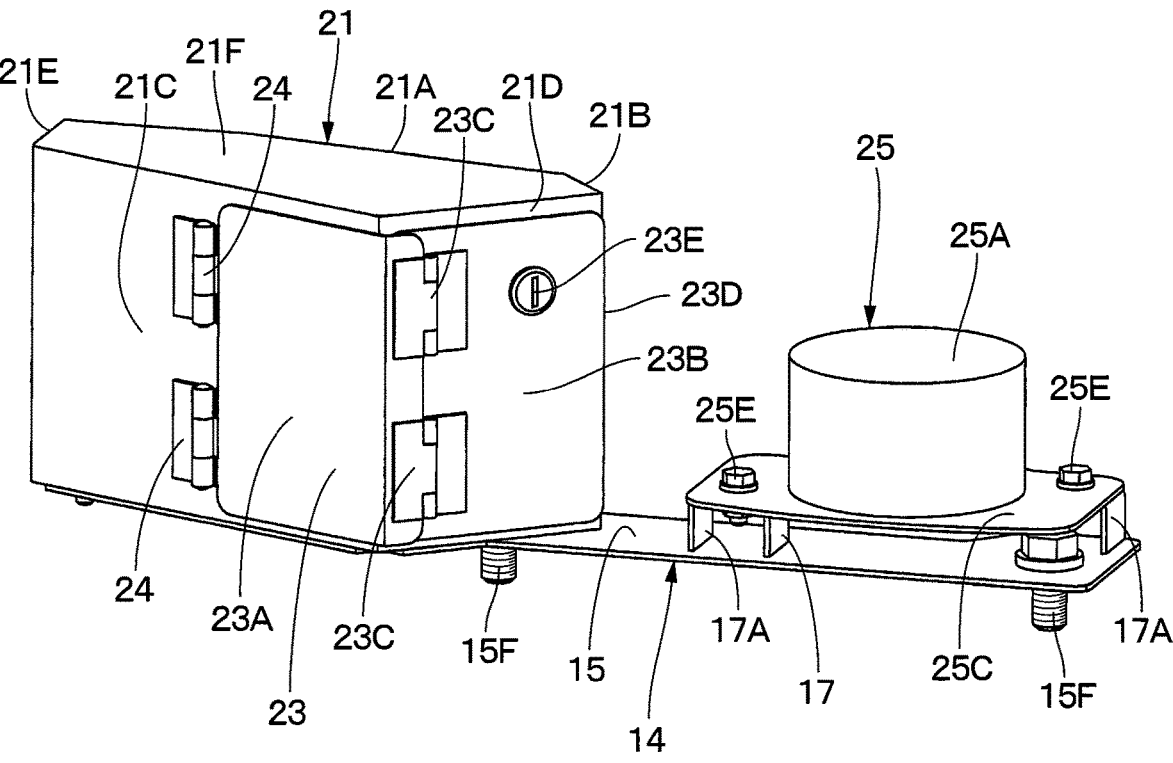
FIG. 5 is a perspective view showing the base member, the connector cover, a lid body and the indicator lamp.

As shown in FIG. 3, in a state where the power feeding connector 18 is attached to the connector attaching seat 16, the insert port 18A of the power feeding connector 18 is located to be oriented to the indicator lamp 25-side in the left-right direction and is located to be oriented to the backward of the indicator lamp 25. Because of this arrangement, the power feeding cable 19 connected to the power feeding connector 18 can be prevented from being displaced ahead of the indicator lamp 25. Therefore, when a worker present ahead of or lateral to the electric hydraulic excavator 1 on the right looks at the indicator lamp 25 visually, a visual line of the worker is not blocked by the power feeding cable 19, allowing the worker to visually look at the indicator lamp 25 certainly. In addition, when an operator sitting on the operator's seat 7 turns back, since a visual line of the operator is not blocked by the power feeding cable 19, the operator can visually look at the indicator lamp 25 certainly.

Further, the insert port 18A of the power feeding connector 18 is located to be oriented to the downward of the indicator lamp 25. With this arrangement, the power feeding cable 19 connected to the power feeding connector 18 can be prevented from crossing just behind the indicator lamp 25. Because of this reason, when a worker present behind the electric hydraulic excavator 1 looks at the indicator lamp 25 visually, a visual line of the worker is not blocked by the power feeding cable 19, therefore allowing the worker to visually look at the indicator lamp 25 certainly.

Figure 6:
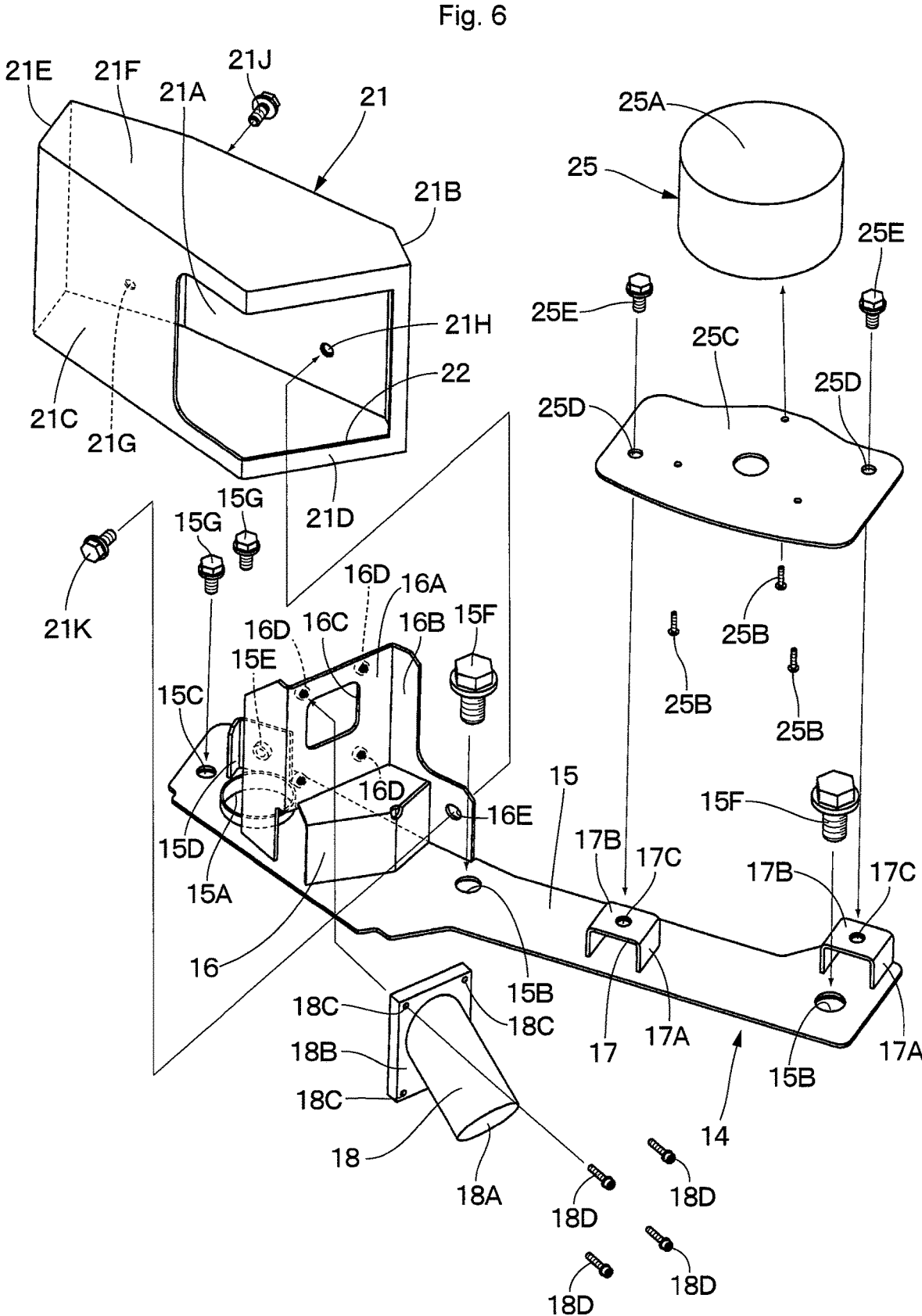
FIG. 6 is an exploded perspective view showing the base member, the power feeding connector, the connector cover and the indicator lamp.
Figure 7:
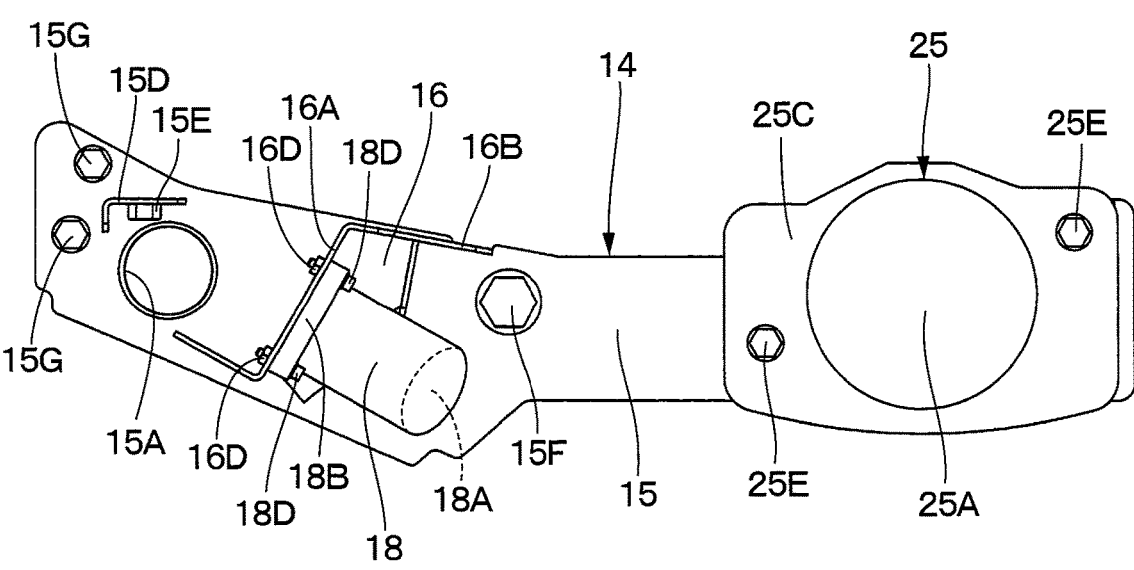
FIG. 7 is a plan view showing the base member, the power feeding connector and the indicator lamp as viewed from the upper side.

The connector cover 21 is disposed on the connector attaching seat 16 of the base member 14 to cover the power feeding connector 18 attached to the connector attaching seat 16. As shown in FIG. 6 and FIG. 8, the connector cover 21 is formed in a boxy shape with the lower side being open in such a manner as to be surrounded by a left front surface plate 21A, a right front surface plate 21B, a left rear surface plate 21C, a right rear surface plate 21D, a left side surface plate 21E and an upper surface plate 21F.

A bolt through hole 21G is disposed in the left end side of the left front surface plate 21A configuring part of the connector cover 21. The bolt through hole 21G corresponds to the nut 15E disposed in the cover attaching plate 15D of the base plate 15. A bolt through hole 21H is disposed in the right end side of the left front surface plate 21A. The bolt through hole 21H corresponds to the bolt through hole 16E disposed in the cover attaching plate 16B of the connector attaching seat 16. The connector cover 21 is attached to the connector attaching seat 16 by a bolt 21J inserted in the bolt through hole 21G being threaded with the nut 15E of the base plate 15 (cover attaching plate 15D) and a bolt 21K inserted in the bolt through hole 16E of the connector attaching seat 16 (cover attaching plate 16B) and in the bolt through hole 21H being threaded with a nut.

An open portion 22 of the connector cover 21 is formed over an entire region from the right side of the left rear surface plate 21C to the right rear surface plate 21D forming part of the connector cover 21. The open portion 22 is formed in a rectangular shape extending in the left-right direction and corresponds to the insert port 18A of the power feeding connector 18 attached to the connector attaching seat 16. Accordingly, the power feeding cable 19 is inserted through the open portion 22 in the inside of the connector cover 21 and is fitted in the insert port 18A of the power feeding connector 18.

A lid body 23 is attached via a hinge mechanism 24 to the left rear surface plate 21C of the connector cover 21 to cover the open portion 22 to be openable and closable. The lid body 23 has a left lid body 23A abutting on the left rear surface plate 21C of the connector cover 21 and a right lid body 23B abutting on the right rear surface plate 21D of the connector cover 21. The right lid body 23B is attached to be rotatable via a hinge member 23C with respect to the left lid body 23A. The lid body 23 is displaced to a closed position (position in FIG. 5) where the open portion 22 is closed to cover over the power feeding connector 18 and an open position (for example, a position in FIG. 8) where the lid body 23 is rotated centering on the hinge mechanism 24 to open the open portion 22.

When the lid body 23 is displaced to the open position, a tip end 23D (right end of the right lid body 23B) of the lid body 23 moves backward (in an arrow A direction in FIG. 8) about the hinge mechanism 24 as the fulcrum to cause the entirety of the lid body 23 to open backward. Because of this arrangement, when the lid body 23 is opened, the lid body 23 is not displaced ahead of the indicator lamp 25. There-fore, when a worker present ahead of the electric hydraulic excavator 1 on the right looks at the indicator lamp 25 visually, the visual line of the worker is not blocked by the lid body 23. In addition, when an operator sitting on the operator's seat 7 turns back, a visual line of the operator is not blocked by the lid body 23. On the other hand, a locking member 23E is disposed in the right lid body 23B of the lid body 23. The locking member 23E retains the lid body 23 in the closed position, and when the locking member 23E is unlocked by a key member (not shown), the lid body 23 can be displaced to the open position.

The indicator lamp 25 is s disposed on the upper revolving structure 3 to be positioned closer to the rear side than the operator's seat 7. The indicator lamp 25 is attached on the indicator lamp attaching seat 17 of the common base mem-ber 14 attached to the counterweight 10 to be integral with the power feeding connector 18. The indicator lamp 25 projects upward from the upper surface 10B of the coun-terweight 10 in a position adjacent to the right side of the power feeding connector 18. The indicator lamp 25 lights up at the traveling of the lower traveling structure 2 or at the revolving of the upper revolving structure 3 and at the operating of the working mechanism 4 (at the working of the electric hydraulic excavator 1), which informs workers around the electric hydraulic excavator 1 that the electric hydraulic excavator 1 is in the middle of operating for attracting attention.

The indicator lamp 25 is provided with an indicator lamp main body 25A that lights up at the working of the electric hydraulic excavator 1 and a flat-plate shaped attaching plate 25C fixed on a lower surface of the indicator lamp main body 25A by using a plurality (for example, three) of bolts 25B. The attaching plate 25C is provided with two bolt through holes 25D separated from each other in the left-right direction, and the two bolt through holes 25D correspond to the bolt through holes 17C of the two frame bodies 17A configuring part of the indicator lamp attaching seat 17 of the base member 14.

The indicator lamp 25 is attached to the indicator lamp attaching seat 17 by bolts 25E inserted in the bolt through holes 25D of the attaching plate 25C being threaded with nuts (not shown) welded on the backside of the bolt through holes 17C of the indicator lamp attaching seat 17. In this way, in a state where the power feeding connector 18 is attached on the connector attaching seat 16 of the base member 14 and the indicator lamp 25 is attached on the indicator lamp attaching seat 17, the insert port 18A of the power feeding connector 18 is located on the indicator lamp 25-side to face the indicator lamp main body 25A in the left-right direction. With this configuration, when the indi-cator lamp 25 lights up at the working of the electric hydraulic excavator 1, the power feeding connector 18 and the power feeding cable 19 connected to the power feeding connector 18 can be illuminated by the light emitted from the indicator lamp 25.

In addition, the power feeding connector 18 and the indicator lamp 25 are attached via the common base member

14 on the upper surface 10B of the counterweight 10 in a state of being integrally attached to the common base member 14. Because of this arrangement, the power feeding connector 18 and the indicator lamp 25 can be attached to the counterweight 10 in a state of being united. As a result, for example, as compared to a case where the power feeding connector 18 and the indicator lamp 25 are separately attached to the counterweight 10, the workability on the attaching work can be improved.

The electric hydraulic excavator 1 according to the pres-ent embodiment has the configuration as described above, and hereinafter, an explanation will be made of the operation of the electric hydraulic excavator 1.

In a case of driving the electric hydraulic excavator 1 with the electric power fed from the external power source 13, the lid body 23 disposed on the connector cover 21 is displaced from the closed position to the open position to release the open portion 22 of the connector cover 21. In this state, the power feeding cable 19 connected to the external power source 13 is fitted in the insert port 18A of the power feeding connector 18. Because of this arrangement, the electric power fed from the external power source 13 is supplied to the electric motor (not shown), and the electric motor drives the hydraulic pump (not shown) with the electric power fed from the external power source.

When an operator operates the traveling lever and pedal 8 in this state, the electric hydraulic excavator 1 can be caused to travel to the working site. After the electric hydraulic excavator 1 moves to the working site, when the operator operates the working operational lever 9, it is possible to carry out an excavating work of earth and sand or the like by the working mechanism 4 while revolving the upper revolving structure 3. The indicator lamp 25 lights up at the traveling of the lower traveling structure 2 or at the revolving of the upper revolving structure 3 and at the operating of the working mechanism 4 (at the working of the electric hydraulic excavator 1). With this configuration, workers present around the electric hydraulic excavator 1 can be informed that the electric hydraulic excavator 1 is in the middle of operating for attracting attention.

In this case, since the insert port 18A of the power feeding connector 18 is located to be oriented to the indicator lamp 25-side in the left-right direction, the power feeding cable 19 connected to the insert port 18A can be illuminated by the light emitted from the indicator lamp 25. This arrangement can cause, at the night-time working using the electric hydraulic excavator 1, the operator of and the workers around the electric hydraulic excavator 1 to recognize that the electric power fed from the external power source 13 is being supplied via the power feeding cable 19 connected to the power feeding connector 18 to the electric hydraulic excavator 1 and that the electric hydraulic excavator 1 is in the middle of operating with this electric power. As a result, it is possible to avoid the event that the workers around erroneously pull out the power feeding cable 19 from the power feeding connector 18 in the middle when the electric power fed from the external power source 13 is being supplied to the electric hydraulic excavator 1.

Particularly, even in a case where at the night-time working the illumination facility for illuminating the electric hydraulic excavator 1 is not sufficient for light, the power feeding cable 19 connected to the power feeding connector 18 can lightly be illuminated by the light emitted from the indicator lamp 25. As a result, the operator of and the workers around the electric hydraulic excavator 1 can clearly recognize the power feeding cable 19 connected to the power feeding connector 18.

In addition, the insert port 18A of the power feeding connector 18 is located to be oriented to the downward of the indicator lamp 25. This arrangement can prevent the power feeding cable 19 connected to the power feeding connector 18 from crossing just behind the indicator lamp 25. As a result, when a worker is present behind the electric hydraulic excavator 1, a visual line of the worker looking at the indicator lamp 25 visually is not blocked by the power feeding cable 19, allowing the worker to visually look at the indicator lamp 25 certainly.

In addition, the insert port 18A of the power feeding connector 18 is located to be oriented to the backward of the indicator lamp 25. Because of this arrangement, the power feeding cable 19 connected to the power feeding connector 18 can be prevented from being displaced ahead of the indicator lamp 25. Therefore, when a worker present ahead of or lateral to the electric hydraulic excavator 1 on the right looks at the indicator lamp 25 visually, a visual line of the worker is not blocked by the power feeding cable 19, allowing the worker to visually look at the indicator lamp 25 certainly. In addition, when an operator sitting on the operator's seat 7 turns back, since a visual line of the operator is not blocked by the power feeding cable 19, the operator can visually look at the indicator lamp 25 certainly. As a result, for example in a case where the indicator lamp 25 does not light up due to a failure or the like at the operating of the electric hydraulic excavator 1, the operator can recognize the failure of the indicator lamp 25, quickly carrying out a repair or the like to the failure.

Further, since the power feeding cable 19 is connected to the insert port 18A of the power feeding connector 18, when the open portion 22 of the connector cover 21 is released, the lid body 23 is not displaced ahead of the backward indicator lamp 25 but opens about the hinge mechanism 24 as the fulcrum. With this arrangement, when a worker present ahead of the electric hydraulic excavator 1 on the right looks at the indicator lamp 25 visually, a visual line of the worker is not blocked by the lid body 23, allowing the worker to visually look at the indicator lamp 25 certainly. In addition, when an operator sitting on the operator's seat 7 turns back, since a visual line of the operator is not blocked by the lid body 23, the operator can visually look at the indicator lamp 25 certainly.

In this way, according to the present embodiment the electric hydraulic excavator 1 comprises: an automotive vehicle body composed of the lower traveling structure 2 and the upper revolving structure 3 and provided with the operator's seat 7; and the working mechanism 4 disposed on the upper revolving structure 3, the upper revolving structure 3 including: the electric motor serving as the power source; the battery 12 for storing the electric power to be supplied to the electric motor; the power feeding connector 18 to which the power feeding cable 19 for supplying electric power to the electric motor or the battery 12 is connected; and the indicator lamp 25 that lights up when the lower traveling structure 2, the upper revolving structure 3 or the working mechanism 4 is in the middle of operating, characterized in that the power feeding connector 18 and the indicator lamp 25 are arranged in back of the operator's seat 7 and the insert port 18A of the power feeding connector 18 which the power feeding cable 19 is connected or disconnected is located to be oriented to the indicator lamp 25-side in the left-right direction.

According to this configuration, it is possible to illuminate the power feeding cable 19 connected to the insert port 18A by the light emitted from the indicator lamp 25. With this configuration, the electric power fed from the external power source 13 is supplied via the power feeding cable 19 to the electric hydraulic excavator 1, allowing the operator and the workers around to recognize that the electric hydraulic excavator 1 is in the middle of operating with this electric power. As a result, it is possible to avoid the event that although the electric power fed from the external power source 13 is being supplied to the electric hydraulic excavator 1, the worker around erroneously pulls out the power feeding cable 19 from the power feeding connector 18.

The embodiment is provided with the base member 14 for attaching the power feeding connector 18 and the indicator lamp 25, and the base member 14 is attached to the counterweight 10 of the upper revolving structure 3. According to this configuration, the power feeding connector 18 and the indicator lamp 25 can be attached to the counterweight 10 in a state of being united. As a result, for example, as compared to a case where the power feeding connector 18 and the indicator lamp 25 are separately attached to the counterweight 10, the workability on the attaching work for attaching the power feeding connector 18 and the indicator lamp 25 can be improved.

In the embodiment, the insert port 18A of the power feeding connector 18 is located to be oriented to the backward of the indicator lamp 25. According to this configuration, the power feeding cable 19 connected to the power feeding connector 18 can be prevented from being displaced ahead of the indicator lamp 25. Therefore, when a worker present ahead of or lateral to the electric hydraulic excavator 1 on the right looks at the indicator lamp 25 visually, a visual line of the worker is not blocked by the power feeding cable 19, allowing the worker to visually look at the indicator lamp 25 certainly. In addition, when an operator turns back from the operator's seat 7, since a visual line of the operator is not blocked by the power feeding cable 19, the operator can visually look at the indicator lamp 25 certainly. As a result, for example in a case where the indicator lamp 25 does not light up due to a failure or the like at the operating of the electric hydraulic excavator 1, the operator can recognize the failure of the indicator lamp 25, quickly dealing with the failure.

In the embodiment, the insert port 18A of the power feeding connector 18 is located to be oriented to the downward of the indicator lamp 25. According to this configuration, the power feeding cable 19 connected to the power feeding connector 18 can be prevented from crossing just behind the indicator lamp 25. As a result, when a worker is present behind the electric hydraulic excavator 1, a visual line of the worker looking at the indicator lamp 25 visually is not blocked by the power feeding cable 19, allowing the worker to visually look at the indicator lamp 25 certainly.

In the embodiment, the connector cover 21 for covering the power feeding connector 18 attached on the base member 14 is disposed on the base member 14, the open portion 22 is disposed on the connector cover 21 to correspond to the insert port 18A of the power feeding connector 18 and the lid body 23 is disposed via the hinge mechanism 24 to the connector cover 21 to cover the open portion 22 to be openable and closable, wherein the lid body 23 opens backward about the hinge mechanism 24 as the fulcrum. According to this configuration, since the power feeding cable 19 is connected to the insert port 18A of the power feeding connector 18, when the open portion 22 of the connector cover 21 is released, the lid body 23 opens backward without being displaced ahead of the indicator lamp 25. Because of this arrangement, when the worker present ahead of the electric hydraulic excavator 1 on the right looks at the indicator lamp 25 visually, a visual line of the worker is not blocked by the lid body 23, allowing the worker to visually look at the indicator lamp 25 certainly. In addition, when an operator turns back from the operator's seat 7, since a visual line of the operator is not blocked by the lid body 23, the operator can visually look at the indicator lamp 25 certainly.

It should be noted that the embodiment shows as an example a case of disposing the indicator lamp 25 on the right side to the power feeding connector 18. However, the present invention is not limited thereto but may be, for example so configured that an indicator lamp is disposed on the left side to a power feeding connector and an insert port is located to be oriented to an indicator lamp side in the left-right direction.

DESCRIPTION OF REFERENCE NUMERALS

2: LOWER TRAVELING STRUCTURE (VEHICLE BODY)
3: UPPER REVOLVING STRUCTURE (VEHICLE BODY)
4: WORKING MECHANISM
7: OPERATOR'S SEAT
12: BATTERY
14: BASE MEMBER
18: POWER FEEDING CONNECTOR
18A: INSERT PORT
19: POWER FEEDING CABLE
21: CONNECTOR COVER
22: OPEN PORTION
23: LID BODY
24: HINGE MECHANISM
25: INDICATOR LAMP

The invention claimed is:

1. An electric construction machine comprising:
an automotive vehicle body provided with a lower traveling structure and an upper revolving structure that is mounted via a revolving device on the lower traveling structure; and
a working mechanism disposed on the upper revolving structure,
the upper revolving structure including:
an operator's seat;
an electric motor serving as a power source;
a battery for storing electric power to be supplied to the electric motor;
a power feeding connector to which a power feeding cable for supplying the electric power to the electric motor or the battery is connected; and an indicator lamp that lights up when the working mechanism is in the middle of operating, wherein:
the electric construction machine further comprises:
a connector cover that covers the power feeding connector, and has an open portion that is arranged between an insert port of the power feeding connector to which the power feeding cable is connected or disconnected and the indicator lamp;
a lid body that covers the open portion to be openable and closable;
a counterweight included in the upper revolving structure and positioned behind the operator's seat; and
a base member on which the power feeding connector and the indicator lamp are attached, wherein
the lid body is displaced to a closed position where the open portion of the connector cover is closed, to cut off the insert port of the power feeding connector from the indicator lamp,
the lid body is displaced to an open position where the open portion of the connector cover is opened, not to cut off the insert port of the power feeding connector from the indicator lamp,
the power feeding connector and the indicator lamp are arranged in back of the operator's seat,
the insert port of the power feeding connector is located to be oriented to the indicator lamp side in the left-right direction,
the base member is attached on the upper surface of the counterweight, and
the indicator lamp is projected upward from the upper surface of the counterweight.

2. The electric construction machine according to claim 1, wherein
the insert port of the power feeding connector is located to be oriented backward of the indicator lamp.

3. The electric construction machine according to claim 1, wherein
the insert port of the power feeding connector is located to be oriented downward of the indicator lamp.

4. The electric construction machine according to claim 1, wherein
the lid body is attached via a hinge mechanism to the connector cover to cover the open portion to be openable and closable, wherein the lid body opens backward about the hinge mechanism as a fulcrum.

* * * * *